Feb. 11, 1964     L. H. SMITH     3,120,914
CAR TOP CARRIER
Filed July 14, 1960     4 Sheets-Sheet 2
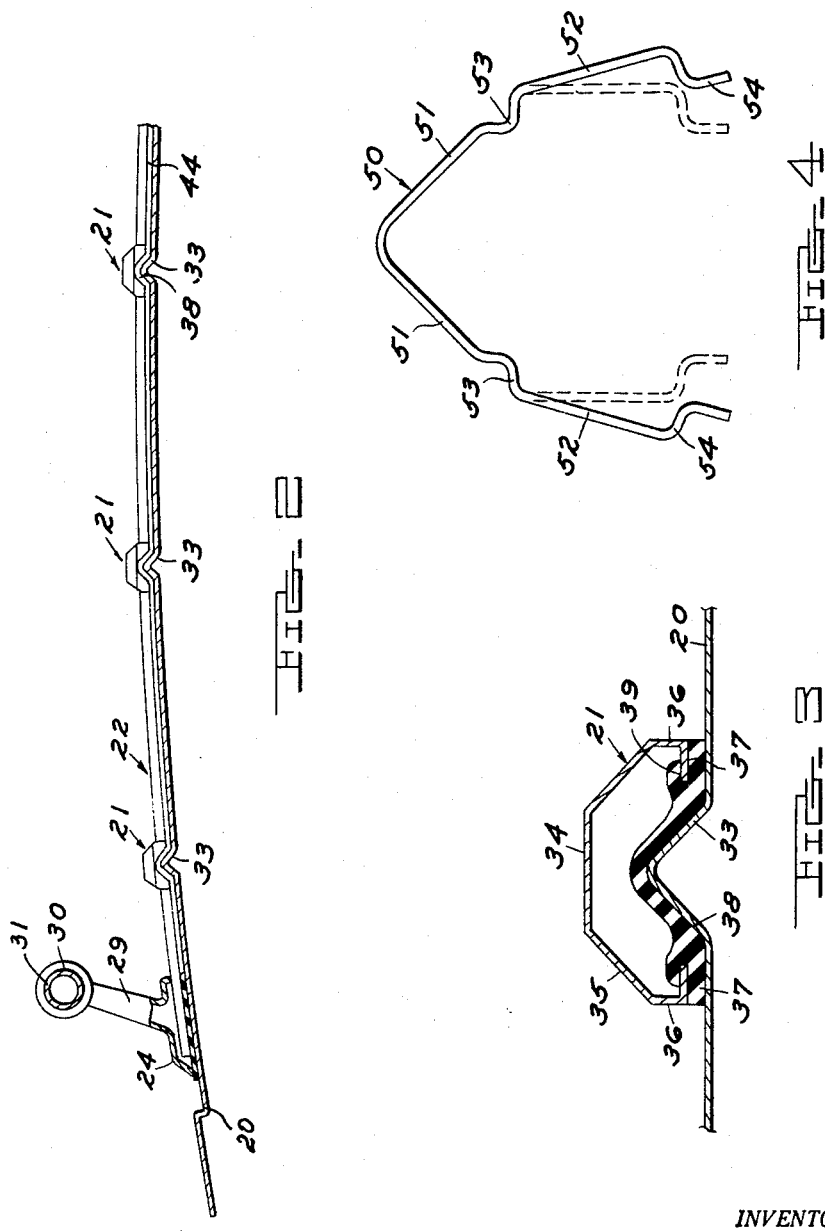
INVENTOR.
LAWRENCE H. SMITH
BY
ATTORNEYS

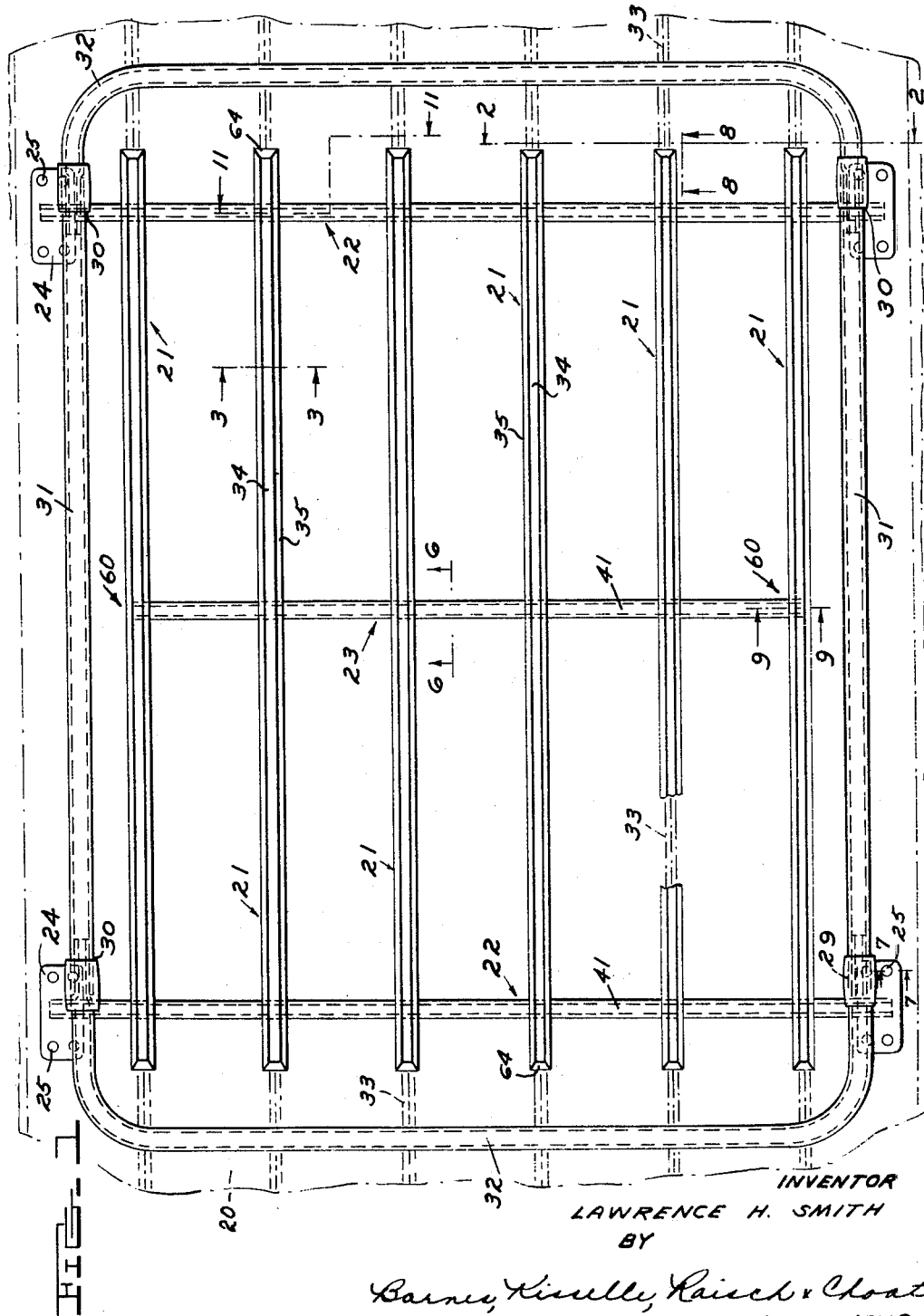

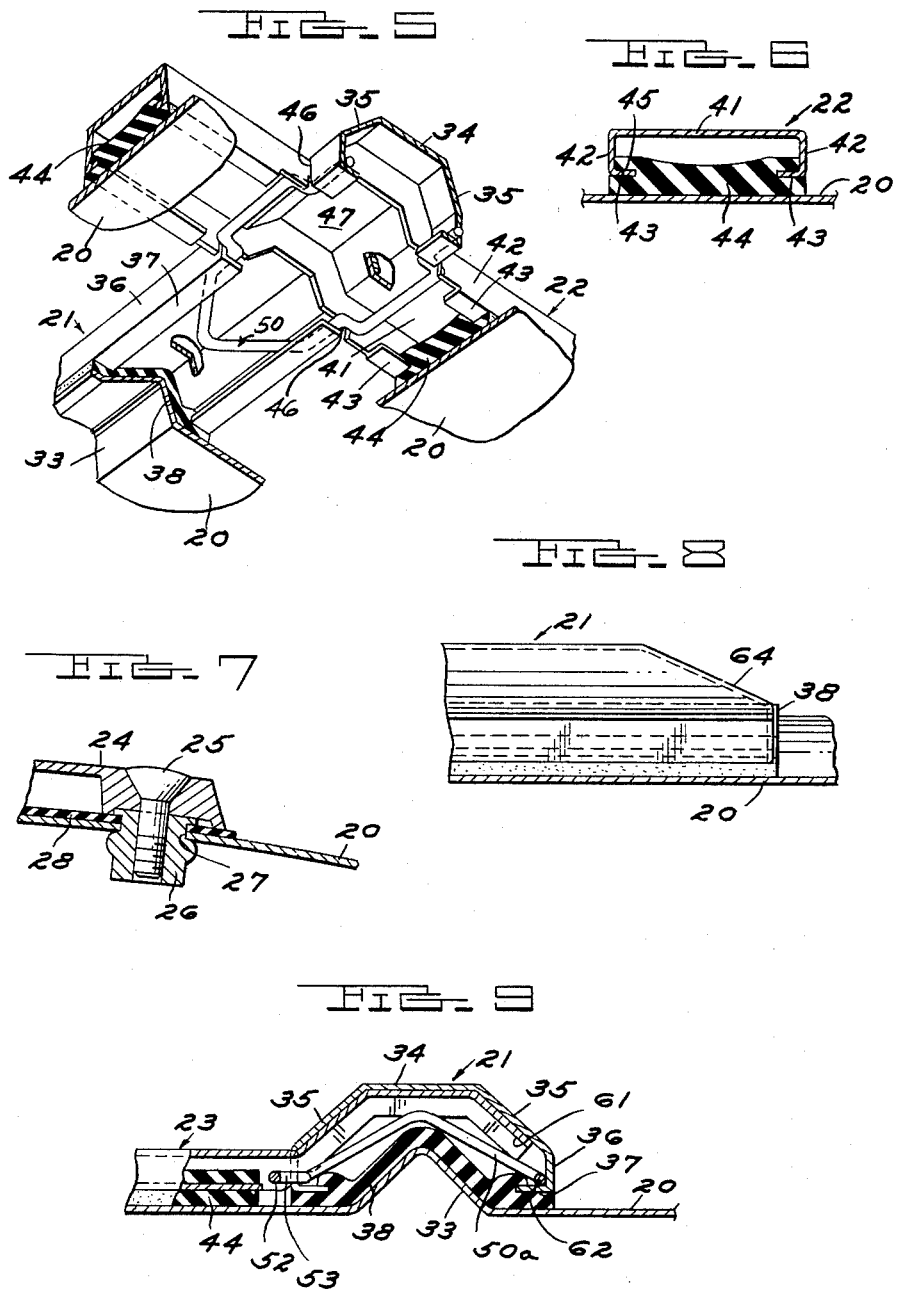

Feb. 11, 1964 L. H. SMITH 3,120,914
CAR TOP CARRIER
Filed July 14, 1960 4 Sheets-Sheet 4
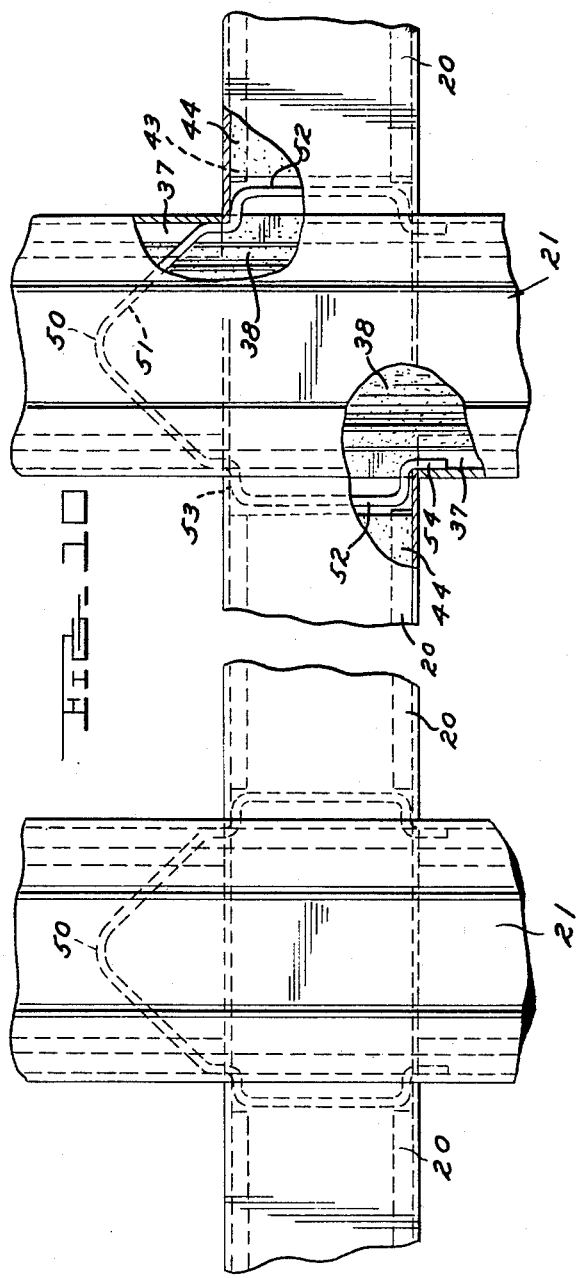
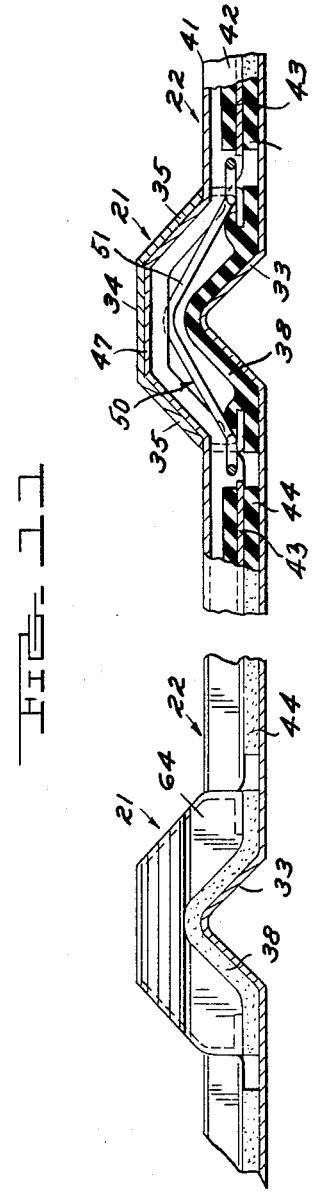
INVENTOR.
LAWRENCE H. SMITH
BY
*Barnes, Kisselle, Raisch & Choate*
ATTORNEYS

United States Patent Office 3,120,914
Patented Feb. 11, 1964

3,120,914
CAR TOP CARRIER
Lawrence H. Smith, Birmingham, Mich., assignor to Helm Accessories, Inc., Detroit, Mich., a corporation of Michigan
Filed July 14, 1960, Ser. No. 42,939
4 Claims. (Cl. 224—42.1)

This invention relates to car top carriers.

It is an object of this invention to provide a car top carrier of novel design which is adapted to rest upon the roof of a car and be fastened thereto.

It is a further object of the invention to provide such a car top carrier which can be readily assembled and disassembled.

It is a further object of the invention to provide such a car top carrier that can be mounted on a car top having integral styling or reinforcing ribs on the surface thereof.

It is a further object of the invention to provide such a car top carrier comprising a plurality of longitudinally extending and transversely extending members having novel connecting means therebetween.

In the drawings:

FIG. 1 is a fragmentary plan view of a car top having the car top carrier embodying the design mounted thereon.

FIG. 2 is a sectional view taken along the line 2—2 in FIG. 1.

FIG. 3 is a fragmentary sectional view on an enlarged scale taken along the line 3—3 in FIG. 1.

FIG. 4 is a plan view of a spring element utilized in the car top carrier.

FIG. 5 is a fragmentary part sectional perspective view of a joint between transverse and longitudinal members, parts being broken away.

FIG. 6 is a fragmentary sectional view on an enlarged scale taken along the line 6—6 in FIG. 1.

FIG. 7 is a fragmentary sectional view on an enlarged scale taken along the line 7—7 in FIG. 1.

FIG. 8 is a fragmentary sectional view on an enlarged scale taken along the line 8—8 in FIG. 1.

FIG. 9 is a fragmentary sectional view on an enlarged scale taken along the line 9—9 in FIG. 1.

FIG. 10 is a fragmentary plan view on an enlarged scale of a portion of the carrier shown in FIG. 1.

FIG. 11 is a fragmentary sectional view on an enlarged scale taken generally along the line 11—11 in FIG. 1.

Referring to FIG. 1, the car top carrier embodying the invention is adapted to be mounted on a car top 20 which is of conventional metal construction and is curved both in longitudinal and transverse cross section. The car top carrier comprises a plurality of transversely spaced longitudinally extending members 21 which rest on the car top and overlap longitudinally spaced transverse members 22, 23. The overlapping portions of the members 21, 22, 23 are connected by a disconnectable joint as presently described.

As shown in FIG. 1, intermediate transverse member 23 terminates at the outermost longitudinal members 21 while the endmost transverse members 22 extend beyond the outermost longitudinal members 21 into underlying relationship with plates 24. The ends of the members 22 extend beneath the plates and the plates are fixed to the roof 20 by screws 25 that are threaded into deformable nuts 26 extending through openings 27 in the roof 20 (FIG. 7). A layer of rubber 28 between the plates 24 and roof 20 provides a water-tight seal preventing water from entering beneath the plate 24 and into the openings 27. As shown in FIG. 2, each plate 24 includes an upwardly extending arm 29 formed with a tubular sleeve 30 at the upper end thereof. The ends of straight longitudinal tubes 31 extend into each sleeve 30 and the ends of U-shaped tubes 32 are constricted and also extend into the sleeves 30 to form a generally rectangular frame that is spaced above the roof of the car for retaining luggage, packages and the like against longitudinal and transverse movement.

Referring to FIGS. 2 and 3, the longitudinal members 21 are adapted to overlie integral ribs 33 in the roof 20 of the car. Such ribs are conventionally provided in the roof of the car for purposes of styling or reinforcement and are herein shown as triangular in cross section. As shown in FIG. 3, each longitudinal member 21 is generally frusto-pyramidal in cross section and includes a flat top section 34, inclined side sections 35, vertical sides 36 and inwardly turned flanges 37. A sealing strip 38 which is generally triangular in cross section to conform to the shape of ribs 33 extends between the flanges 37. Specifically, the flanges 37 project into slots 39 in the side edges of the strip 38. As shown in FIG. 3, the portion of the strip 38 underlying the flanges 37 terminates at the lower edge of the vertical sides 36. In this manner, the sealing strips 38 tightly engage the ribs 33 on the roof 20 to prevent water from entering beneath the members 21 into the interior of their channel section.

Transverse members 22, 23 are identical in cross section. As shown in FIG. 6, transverse member 22 is channel shaped and rectangular in cross section and comprises a flat top portion 41, vertical sides 42 and inwardly directed channels 43. A sealing strip 44 extends between the flanges 43, the flanges 43 extending into slots 45 in the strip 44. As shown in FIG. 6, the sides of the strip 44 terminate at the lower edge of the vertical sides 42 of transverse member 22. In this manner, the strips 44 tightly engage the surface of the roof 20 to prevent water from entering into the interior of the channel shaped transverse member 22.

As shown in FIG. 1, the longitudinal members 21 overlap transverse members 22, 23. A disconnectable joint is provided in the area where the members cross or overlap. As shown in FIG. 5, the joint between overlapping members comprises notches 46 in longitudinal member 21 formed by cutting away portions of the sides 36 and flanges 37. As shown in FIG. 5, the transverse member extends through notches 46 in underlying relation to the top 34 and side section 35 of longitudinal member 36. In addition, in order to provide proper clearance for rib 33 on car top 20, a portion of the transverse member 22, designated 47, is formed with an upwardly extending projection that has substantially the same external configuration as the internal configuration of the channel member 21. As shown in FIGS. 5 and 11, the flanges 43 of member 22 are cut away at the area of projection 47. In addition, the sealing strips 38 and 44 are coextensive with the flanges 37, 43, and therefore terminate at the area where the flanges are cut away.

Means are provided for locking each joint between members 21, 22 and comprises the use of a spring lock member 50 such as shown in FIG. 4. Lock member 50 is made of spring wire and comprises a central triangular portion including legs 51 and arms 52 connected to the ends of the legs 51 by short sections 53. Additional sections 54 are provided at the free ends of the arms 52. As shown in FIG. 11, the legs 51 extend upwardly from the plane containing the arms 52 and extensions 53, 54 to provide clearance for the ribs 33. In addition, the length of the arms 52 is substantially equal to the distance between the sides 42 of transverse member 22. In assembly, prior to putting the carrier on the car, the sections 21, 22 are brought into overlapping relation substantially as shown in FIG. 5 and the spring member 50 is sprung into position by squeezing the arms 52 toward one another and permitting them to then expand projecting into the interior of member 22 as shown in FIG. 5, thereby locking the member 22 against movement laterally away from member 21. The joint thereby formed not only firmly holds the members 21, 22 in assembled relation, but, in addition, may be readily disconnected by merely grasping the arms 52 and squeezing the arms to disengage them from the channel 22 thereby permitting the removal of the arms. It may be noted that the extensions 53, 54 engage the sides 36 and member 21 to firmly lock the spring member 50 in position.

The joint heretofore described is found in each instance where a member 21 overlaps a transverse member 22, 23. Where the transverse member 23 terminates at the longitudinal member 21, as at 60, the joint is as shown in FIG. 9 wherein the end of transverse member 23 is cut off as at 61 and the spring member 50a has a conventional arm 52 and connecting portions 53 on one side engaging the channel member 23 and a straight arm 62 on the other side engaging the side wall 36 of channel member 21 which is not cut away.

It can be appreciated that where the free end of longitudinal members 21 terminates it is closed as at 64 (FIG. 8) and the rubber sealing strip 38 extends into position beneath end 64 to form the desired seal (FIG. 11).

The car top carrier is first assembled in position by engaging the joint between members 21, 22 and 23 and is then placed on the car top 20. The members 21, 22, 23 being made of a sheet metal material may be curved to conform with the curvature of the car top. The free ends of the members 22 are then fixed to the car top by the plates 24 to which the frame 32 has been previously fixed.

The car top carrier can be removed at any time by disconnecting the plates, that is, by removing the screws 25 and then the screws 25 can be reinserted to seal the holes in the roof.

It can thus be seen that we have provided a car top carrier that can be readily adapted to the curvature of any car top; which effectively provides a liquid-tight seal with the car top; which can be used with car top carriers incorporating styling or structural ribs in the car top; and which can be readily disconnected and disassembled for storage.

I claim:

1. In a car top carrier, an assembly adapted to be mounted on a car top and comprising a plurality of longitudinally spaced members adapted to extend transversely of said car top, a plurality of transversely spaced members adapted to extend longitudinally of a car top, said transverse and longitudinal members overlapping one another and engaging said car top substantially throughout their lengths, each of said members of one set of members being channel shaped in cross section with the open side thereof adapted to be adjacent a car top, means for fastening the ends of at least some of said members to said car top, and interengaging means between the overlapping portions of said members comprising cut-away portions on the upper said member through which the lower said member extends, and a one piece spring lock member having portions engaging the upper said member and having other portions thereof projecting beneath the lower said member, said lock member being readily engageable and disengageable from said members manually without the use of tools.

2. The combination set forth in claim 1 wherein said lock member comprises a spring wire member including a pair of arms connected at one end and adapted to be resiliently urged away from one another, each of said arms having a projection thereon extending beneath and engaging the lower said member.

3. The combination set forth in claim 1 wherein each said member includes inwardly extending flanges, a sealing strip extending between the flanges of each channel and adapted to engage the car top.

4. In a car top carrier, an assembly adapted to be mounted on a car top and comprising a plurality of longitudinally spaced members adapted to extend transversely of a car top, a plurality of transversely spaced members adapted to extend longitudinally of a car top, at least one set of said members being channel shaped and having an open side adapted to be adjacent said car top, said channel shaped members having portions of the side walls thereof cut away through which the other said members extend, the undersides of said members adapted to contact said car top substantially throughout their entire lengths, and a one piece spring lock member at each overlap of said members comprising a pair of arms connected at one end by a connecting portion and having the other ends thereof free, said arms being resiliently urged away from one another, said connecting portion and the free ends of said arms engaging said channel shaped member with the intermediate portions of said arms between the free ends and the connecting portion extending beneath said other member.

References Cited in the file of this patent

UNITED STATES PATENTS

| | | |
|---|---|---|
| 16,419 | Wickersham | Jan. 13, 1857 |
| 1,335,368 | Cramp | Mar. 30, 1920 |
| 1,789,280 | Armstrong | Jan. 13, 1931 |
| 1,894,482 | Dorsey | Jan. 17, 1933 |
| 2,475,903 | Klas | July 12, 1949 |
| 2,598,776 | Flora | June 3, 1952 |
| 2,591,346 | Fitzgerald | Apr. 1, 1959 |
| 2,919,841 | Helm | Jan. 5, 1960 |
| 2,929,121 | Tinnerman | Mar. 22, 1960 |

FOREIGN PATENTS

| | | |
|---|---|---|
| 302,350 | Switzerland | Dec. 16, 1954 |